(12) United States Patent  
Lawson

(10) Patent No.: US 10,724,911 B1  
(45) Date of Patent: Jul. 28, 2020

(54) BELT TENSION MEASURING DEVICE

(71) Applicant: Conveyor Dynamics, Inc., Bellingham, WA (US)

(72) Inventor: Bradley Lawson, Ourimbah (AU)

(73) Assignee: Conveyor Dynamics, Inc., Bellingham, WA (US)

( * ) Notice: Subject to any disclaimer, the term of this patent is extended or adjusted under 35 U.S.C. 154(b) by 142 days.

(21) Appl. No.: 16/011,084

(22) Filed: Jun. 18, 2018

Related U.S. Application Data

(60) Provisional application No. 62/521,111, filed on Jun. 16, 2017.

(51) Int. Cl.
```
G01L 5/107      (2020.01)
B65G 23/44      (2006.01)
G01L 5/04       (2006.01)
G01L 5/06       (2006.01)
```

(52) U.S. Cl.
CPC .............. *G01L 5/107* (2013.01); *B65G 23/44* (2013.01); *G01L 5/04* (2013.01); *G01L 5/06* (2013.01)

(58) Field of Classification Search
CPC ..... G01L 5/10; G01L 5/04; G01L 5/06; G01L 5/107; B65G 23/44
See application file for complete search history.

(56) References Cited

U.S. PATENT DOCUMENTS

| | | | |
|---|---|---|---|
| 766,040 A | 7/1904 | Humphreys | |
| 800,231 A | 9/1905 | Moss | |
| 3,675,482 A * | 7/1972 | Hewitt | G01L 5/04 73/862.471 |
| 3,832,899 A * | 9/1974 | Nicolau | G01L 5/08 73/862.194 |
| 4,141,245 A * | 2/1979 | Brandstetter | G01L 3/247 474/109 |
| 4,171,640 A * | 10/1979 | van Mastrigt | G01L 5/107 73/862.451 |
| 4,574,943 A | 3/1986 | Green | |
| 4,576,041 A * | 3/1986 | Martin | E21B 43/127 73/152.61 |
| 4,909,086 A * | 3/1990 | Kaneko | G01L 5/10 73/862.194 |
| 4,995,506 A | 2/1991 | Langenbacher et al. | |
| 5,305,648 A * | 4/1994 | Diekhans | F16H 61/662 73/862.191 |
| 5,698,796 A * | 12/1997 | Hirano | G01L 5/042 73/160 |

(Continued)

*Primary Examiner* — Jonathan M Dunlap  
(74) *Attorney, Agent, or Firm* — Schacht Law Office, Inc.; Dwayne Rogge

(57) ABSTRACT

Disclosed herein is a belt tension measuring device utilizing a first end roller, the first end roller supporting the belt; a second end roller having an axis of rotation parallel to the first end roller; a support arm pivotably mounted to pivot about an axis parallel to the axis of rotation of the first end roller; a deflection roller rotatably mounted to the support arm at a distance from the pivot of the support arm; the deflection roller having a rotational axis parallel to the axis of rotation of the first end roller, the roller resting upon the belt, configured to bias the belt against the first roller and second roller; and a position indicator measuring the distance between the axis of the deflection roller and a line drawn between the axis of rotation of the first end roller and the axis of rotation of the second end roller.

10 Claims, 3 Drawing Sheets

(56) References Cited

U.S. PATENT DOCUMENTS

| | | | |
|---|---|---|---|
| 5,965,827 A | 10/1999 | Stanley et al. | |
| 6,205,868 B1 | 3/2001 | Miller | |
| 6,360,596 B1 * | 3/2002 | Callendrier | G01L 1/2243 |
| | | | 73/159 |
| 6,422,096 B1 * | 7/2002 | Bulat | G01L 1/2243 |
| | | | 73/862 |
| 6,508,114 B2 * | 1/2003 | Lawson | G01L 5/101 |
| | | | 73/159 |
| 7,373,837 B2 * | 5/2008 | Ellsworth | G01L 5/102 |
| | | | 73/828 |
| 7,806,004 B2 * | 10/2010 | Ellsworth | G01L 5/107 |
| | | | 73/862.194 |
| 8,024,983 B2 * | 9/2011 | Ellsworth | G01L 5/107 |
| | | | 73/862.453 |
| 8,328,005 B2 * | 12/2012 | King | B65G 43/00 |
| | | | 198/810.04 |
| 8,950,277 B2 * | 2/2015 | Bodeker | G01L 5/06 |
| | | | 73/862.381 |
| 9,587,999 B2 * | 3/2017 | Miyajima | G01L 5/16 |
| 2002/0062688 A1 * | 5/2002 | Lawson | G01L 5/101 |
| | | | 73/159 |
| 2014/0345393 A1 * | 11/2014 | Bodeker | G01L 5/06 |
| | | | 73/862.453 |
| 2016/0076955 A1 * | 3/2016 | Miyajima | G01L 5/16 |
| | | | 73/862.046 |
| 2016/0216183 A1 * | 7/2016 | Mupende | B66C 15/00 |

* cited by examiner

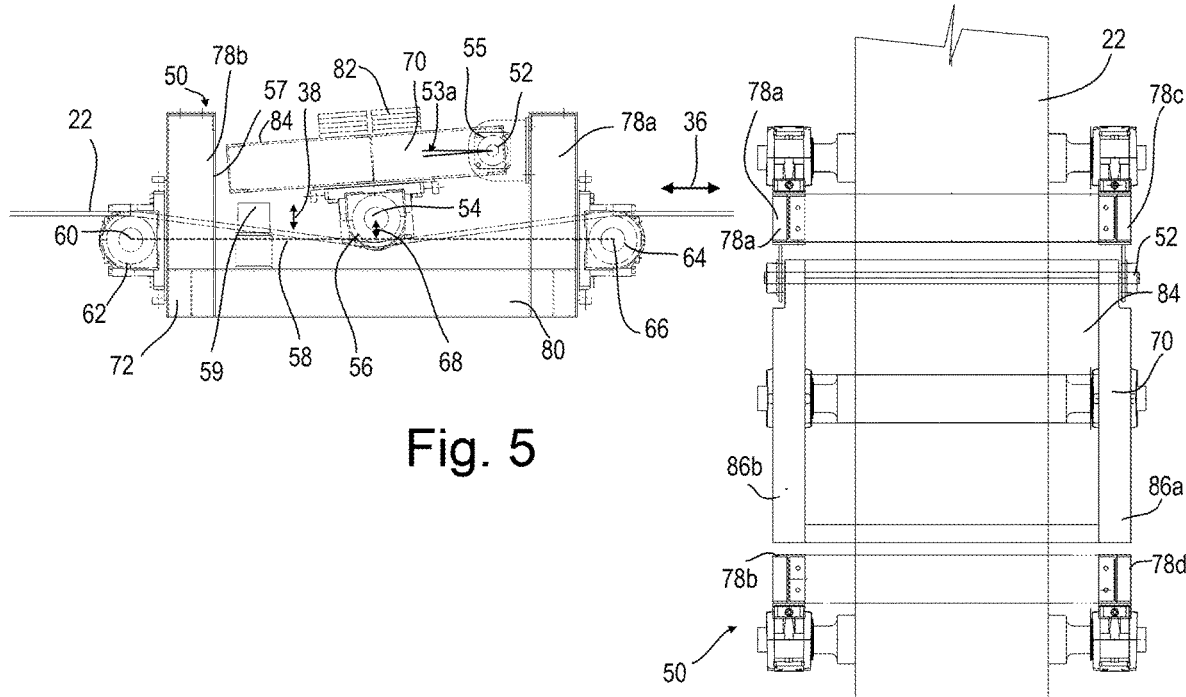
Fig. 5
Fig. 6
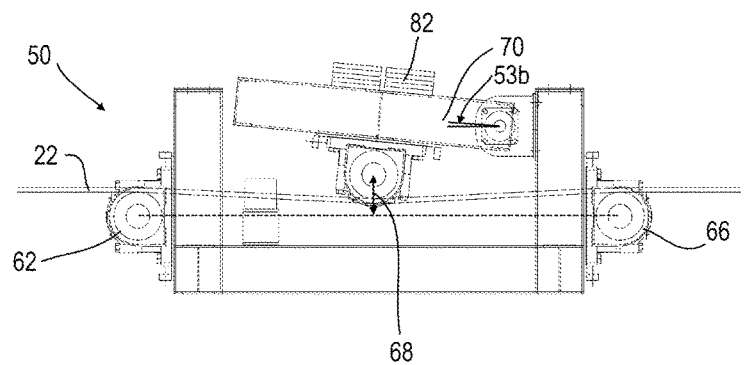
Fig. 7
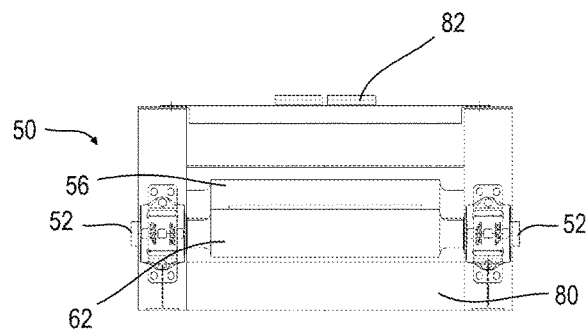
Fig. 8

BELT TENSION MEASURING DEVICE

BACKGROUND OF THE DISCLOSURE

Field of the Disclosure

This disclosure relates to the field of tension measuring devices. The device finds particular benefit in applications using continuous or endless conveyor belts, cables, and similar structures.

BRIEF SUMMARY OF THE DISCLOSURE

Disclosed herein is a belt tension measuring device comprising in one example a first end roller having an axis of rotation, the first end roller supporting the belt at a first location; a second end roller having an axis of rotation parallel to the axis of rotation of the first end roller, the second end roller supporting the belt at a second location; a support arm pivotably mounted to pivot about an axis parallel to the axis of rotation of the first end roller; a deflection roller rotatably mounted to the support arm at a distance from the pivot of the support arm; the deflection roller having a rotational axis parallel to the axis of rotation of the first end roller, the deflection roller resting upon the belt, configured to bias the belt against the first roller and second roller; and a position indicator measuring the distance between the axis of the deflection roller and a line drawn between the axis of rotation of the first end roller and the axis of rotation of the second end roller as a function of belt tension.

In another example is disclosed a belt tension measuring device comprising: a first end support supporting the belt at a first location. The first end support may be a roller. Also disclosed is a second end support supporting the belt at a second location. The second end support may also be a roller. Also disclosed is a support arm mounted to reposition relative to the first end support. Also disclosed is a deflection roller mounted to the support arm; the deflection roller resting upon the belt, configured to bias the belt against the first end support and second end support. Also disclose is a position indicator measuring the position of the deflection the first end support as a function of belt tension. This may be measured relative to the frame, either end support, or other structures and methods disclosed herein and equivalents.

The belt tension device may be arranged wherein the first end support is a first roller having an axis of rotation.

The belt tension device may be arranged wherein the second end support is a second roller having an axis of rotation parallel to the axis of rotation of the first end roller.

The belt tension device may be arranged wherein the position indicator measures the distance between the axis of rotation of the deflection roller and a line drawn between the axis of rotation of the first end roller and the axis of rotation of the second end roller as a function of belt tension.

The belt tension device may be arranged wherein the deflection roller has a rotational axis parallel to the axis of rotation of the first end roller.

The belt tension device may be arranged wherein the position indicator measures the distance between the axis of rotation of the deflection roller and a line drawn between the first end support and the second end roller as a function of belt tension.

The belt tension device may be arranged wherein the second end support is a second roller having an axis of rotation parallel to the axis of rotation of the first end roller.

The belt tension device may be arranged wherein the support arm is pivotably mounted to pivot about an axis parallel to the axis of rotation of the first end roller.

The belt tension device may be arranged wherein the support arm is mounted to linearly reposition relative to the axis of rotation of the first end roller.

BRIEF DESCRIPTION OF THE SEVERAL VIEWS OF THE DRAWINGS

FIG. 5 is a side view of one example of the disclosed belt tension measuring device showing a conveyor belt with a first tension.

FIG. 6 is a top view of the device shown in FIG. 5.

FIG. 7 is a side view conveyor belt tensioning device of FIG. 5 showing a conveyor belt with a second tension; the second tension greater than the first tension shown in FIG. 5.

FIG. 8 is and end view of the device shown in FIG. 5.

DETAILED DESCRIPTION OF THE DISCLOSURE

Figure 1:
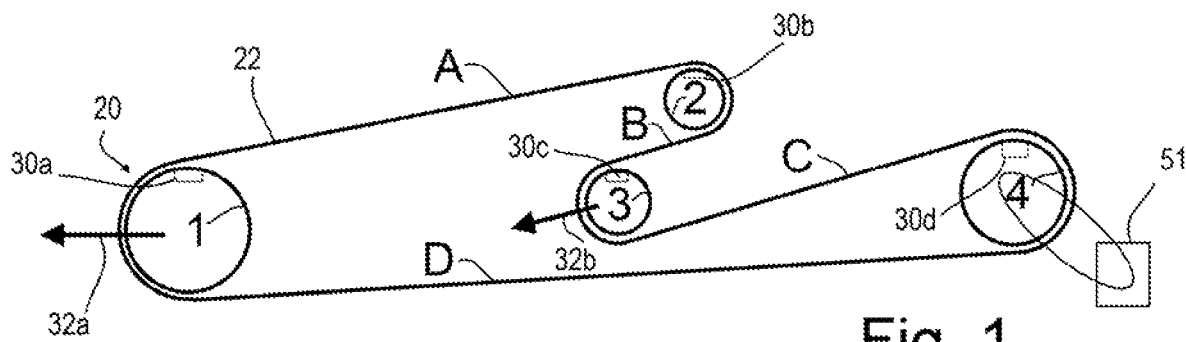
FIG. 1 is a highly schematic side view of one example of a continuous conveyor assembly with a first tension.
Figure 2:
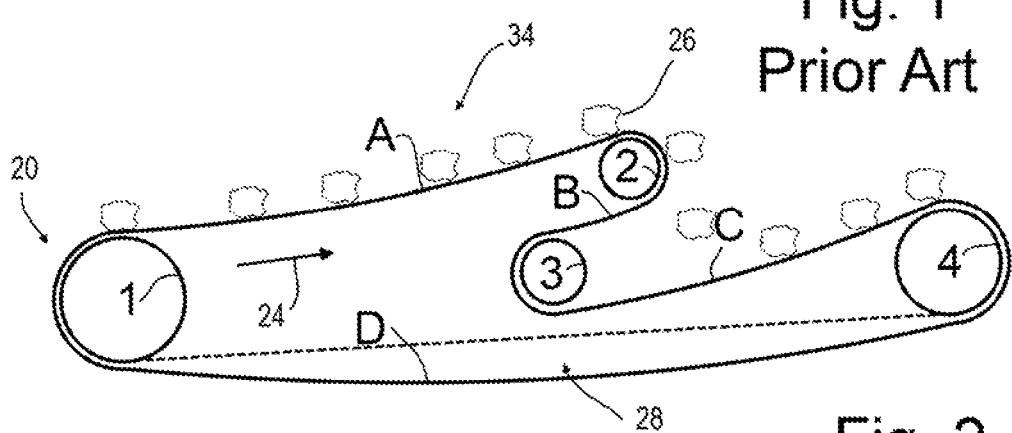
FIG. 2 is a highly schematic view of the continuous conveyor assembly shown in FIG. 1 with a second tension, the second tension less than the first tension shown in FIG. 1.

Before the belt tensioning device is described in detail, a background to the art of conveyor belts and general knowledge is included below.

In the field of conveyor belts, suspended belts, suspended cables, etc., it has been known that determining the correct tension in the belt improves efficiency and control of the overall system utilizing the belt or cable. For ease in description, the term "conveyor belt" will be generally used to encompass all such belt, cable, rope, line, strap, structures and their equivalents both continuous and non-continuous.

Determining and maintaining the correct tension in such a conveyor belt system however is problematic due to the nature of such conveyors and their varying loads. Looking to FIG. 1 for example is a highly schematic example of a conveyor assembly 20 having a first roller 1, a second roller 2, a third roller 3, and a forth roller 4. The rollers 1, 2, and 4, support the conveyor belt 22, while the third roller 3 is utilized to measure tension and/or provide tension to the belt 22. For descriptive purposes regions of the belt are defined relative to these rollers 1-4. For example the region between roller 1 and roller 2 defines region A, the region between roller 2 and roller 3 defines region B, the region between roller 3, and roller 4 defines region C, and the region between roller 4 and roller 1 defines region D.

Figure 3:
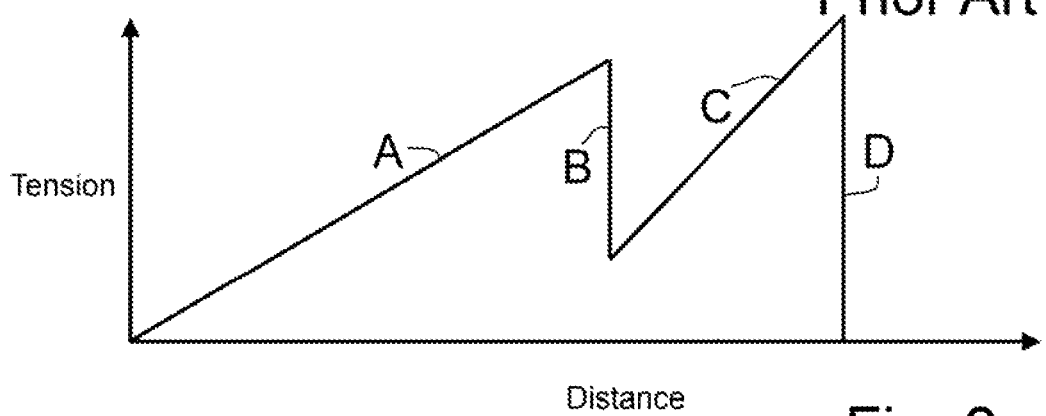
FIG. 3 is a tension-distance chart showing the tension of a conveyor belt along the length of the conveyor belt shown in FIG. 1.

While any of the rollers 1-4 or combination thereof may be driven (powered rotation) by a drive motor 51 such as by an electric motor, hydraulic engine, etc. attached to the roller so as to provide powered rotation to the roller. This motive force is then transferred to the conveyor belt 22 in contact with the driven rotor. Powered rotation of one or more of the rollers 1-4 can result in a tension over distance curve with dramatic points at each roller such as shown in the example of FIG. 3.

In one example, wherein the roller 2 is powered it will provide a pulling force against the conveyor belt 22 in the region A. Without additional offset, the tension in the region B will be significantly less than in the region A as the belt 22 is "pushed" by the powered roller 2 to the region B and may undesirably sag (due to insufficient tension). Similarly, powering of the roller 3 with the belt 24 moving in the direction of travel 24 may result in tension at the region B and relative compression (potentially sag) at the region C. As shown, the material 26 which is transported by the belt 22 and passes in direction of travel 24 from the region A to the region B. In many applications, tension in the region B and compression in the region C is not desired, as being inefficient and potentially damaging the conveyor belt 22 along with associated components of the conveyor assembly 20.

Similarly, powered rotation of roller 4 results in tension in the region C and compression in the region D which can be detrimental. Sag in this region is significantly detrimental if the sag 28 of the belt 22 in the region D is large enough that the belt 22 oscillates and/or contacts other surfaces below the conveyor assembly 20, or slips on the roller 1 (if the belt is too low, the traction (friction) between the belt and the roller 1 is reduced, and the belt will slip on the roller 1 when driven (powered rotation).

To help to ensure a more even distribution of tension, and control of driven torque; prior art conveyor assemblies utilized load cells 30 (30a-30d) positioned along the belt 22 as shown schematically in FIG. 1. Commonly, these load cells 30 are positioned at the rollers and comprise a strain gauge which measures the force applied on a particular roller under a fixed deflection 38. For example the load cell 30 may measure the pressure or tension between the roller outer surface and the roller shaft. Such strain gauges are known to be difficult to calibrate in the field and are commonly prone to failure.

A deflection roller system as disclosed herein measures tension of the conveyor belt in a different manner, by measuring a forced deflection angle 53 or distance 38 of the conveyor belt given a measured force, whereas the known prior art measures the force required for a constant deflection distance 38 or angle 53. The belt tension measuring device 50 disclosed herein measures the deflection 38 of the conveyor belt 22 for a constant deflection force.

In addition to the powered rollers and strain gauges, tensioning devices 32 (32a-32b) may be utilized on the belt 22 or on the rollers to provide global or local tension to the belt 22. In some applications, these tensioning devices 32 comprise springs actuators, electric actuators, hydraulic actuators, pneumatic actuators, or weighted actuators providing dynamic tension to the belt 22.

Another problem often results as the rollers are initially powered (provided with rotational force) upon starting the conveyor assembly 20 or upon a variance of the load (weight or volume of material 26 being conveyed), as the load cells 30 are commonly unable to correctly and accurately determine the tension on the belt 22 with a rapidly varying load 34. In practice it has been found that without proper calibration and operation of load cells 30, the tension/distance curve shown in FIG. 3 becomes erratic with efficiency and adequate control impossible to maintain.

To overcome the deficiencies of prior art load cells in a conveyor assembly 20, the disclosed belt tension measuring device 50 disclosed herein was invented.

Looking to FIG. 5 is shown one example of the disclosed belt tension measuring device 50 which replaces or cooperates with the load cells 30 previously described in a conveyor belt assembly 20. The disclosed belt tension measuring device 50 in one example also cooperates with the motors 51 or actuating devices of the conveyor assembly 20 and or tensioning devices 32 previously described. The apparatus configured such that measured tension beyond the parameters of a prescribed and calibrated range will result in adjustment of the rotational torque provided via the associated motor 51 or alternatively adjustment of tensioning devices 32.

Figure 4:
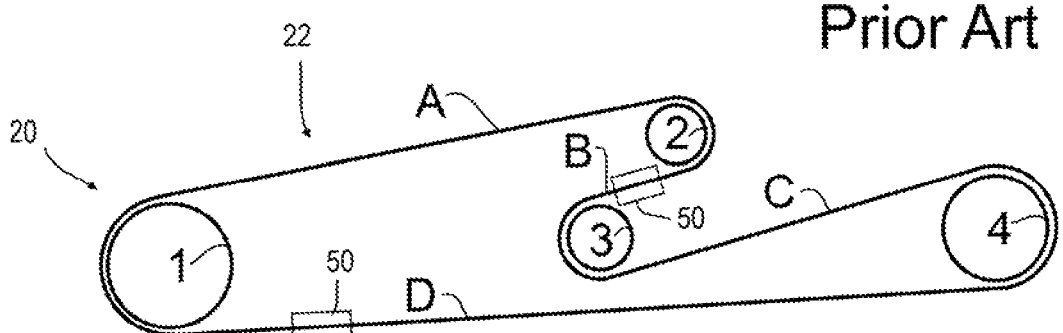
FIG. 4 is a highly schematic view of one example of the disclosed belt tension measuring device used with the continuous conveyor belt of FIG. 1 in various optional locations.

In general, the belt tension measuring device 50 measures the localized tension of a conveyor belt 22. Such belt tension measuring devices may be located at various locations along the conveyor belt 22 as shown in FIG. 4. Thus, it is easier to calibrate these belt tension measuring devices than prior known art structures, while providing greater reliability.

Looking to FIG. 5 for example is shown such a belt tension measuring device 50 used on a conveyor belt 22 having a first tension. The conveyor belt 22 shown in FIG. 7 is shown in a second tension. Comparing these drawings, it can be seen that the belt tension measuring device 50 includes components that rotate about a pivot 52 relative to the tension of the belt 22, varying the angle 53 or rotational position of the deflection roller relative to the frame members 78 or attached structures. This rotational position can be measured in various ways: such as a rotation indicator 55 measuring the angle 53, as a linear indicator 57, or a proximity indicator 59 may be utilized. The pivot 52 and associated components to be described in more detail below.

An offset distance 68 is measured either directly or indirectly. In one example this offset distance 68 is measured between the axis 54 of the deflection roller 56 and an arbitrary line, for example a line 58 between the axis 60 of a first end roller 62 and the axis 64 of a second end roller 66. The relative position of the deflection roller 56 to the line 58 can be measured in many ways, three examples are given below.

Figure 9:
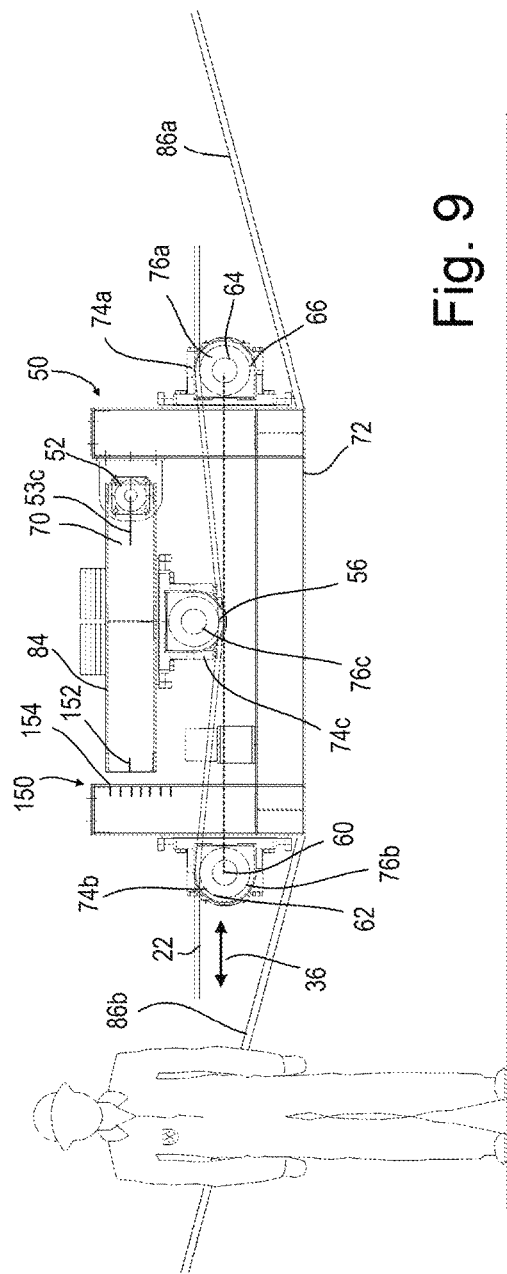
FIG. 9 is a side enlarged view of the device shown in FIG. 5 in a third tension and utilizing a first support system.

Looking to FIG. 5 compared to FIG. 9, and FIG. 7 it can be seen that this offset distance 68 indicates the tension of the belt 22. In the examples it is assumed that the same force is being applied to the belt 22 by the support arm 70. FIG. 5 clearly showing a belt 22 with less tension than shown in FIG. 9, in that the belt is being deflected a greater distance 68.

Looking to FIG. 5 the relative position of the axis 54 of the deflection roller 56 relative to the line 58 can be seen relatively close thereto. In addition, the rotational position of the support arm 70 relative to the first end roller 62 and second end roller 66 is angled downward resulting from a downward deflection 38 of the belt 22. As the tension in belt 22 varies, the deflection 38 or offset distance 68 will vary. Looking to the example of FIG. 7, it can be seen that the tension of the belt 22 has increased from that shown in FIG. 5, thus increasing the offset distance 68 and the relative position of the support arm 70 relative to the rollers 62 and 66. Looking then to FIG. 9, it is shown another example with a different tension of the belt 22 resulting in a different offset 68. As previously mentioned, deflection 30 of the conveyor belt 22 at the deflection roller 56 may be measured in various ways.

Before describing several examples of the methods for measuring the deflection 38 or offset 68, other components of the belt tension measuring device 50 will be disclosed.

Looking to FIG. 9 for example, the belt tension measuring device 50 is shown comprising a frame 72. The first end roller 62 and the second end roller 66 are mounted to the frame 72. In one example the rollers 62 and 66 are mounted to the frame 72 by way of clamping devices 74 (*a-c*) (pillow blocks) engaging bearings 76 (*a-c*) as shown in FIG. 6 which engage the end rollers 62, 66 and allow the end rollers 62 and 66 to rotate relative to the frame 72. In one example shown, the end rollers 62, 66 are mounted to frame members 78 (*a-d*). The frame members 78 in one example are affixed to the frame base member(s) 80 and extend therefrom to provide rigidity and support to the belt tension measuring device 50 without impeding the belt 22.

In one example shown, the support arm 70 is mounted to one or more of the frame members 78 through the pivot 52 such that the deflection roller 56 rests upon the belt 22 between the first end roller 62 and the second end roller 66 so as to allow deflection 38 of the belt 22, as the belt tension varies. This deflection 38 can be measured as disclosed herein.

In the example shown, additional mass 82 may be added to the support arm 70 such as fixing weights to a support plate 84. The support plate 84 in one example extending between and affixed to frame members 86 (*a-b*). The support plate 84 and frame members 86 comprising the support arm 70. In one example shown, the deflection roller 56 may be mounted to the frame members 86 by way of a clamp 74*c* engaging a bearing 76*c* reducing rotational friction between the support arm 70 and the deflection roller 56.

Figure 10:
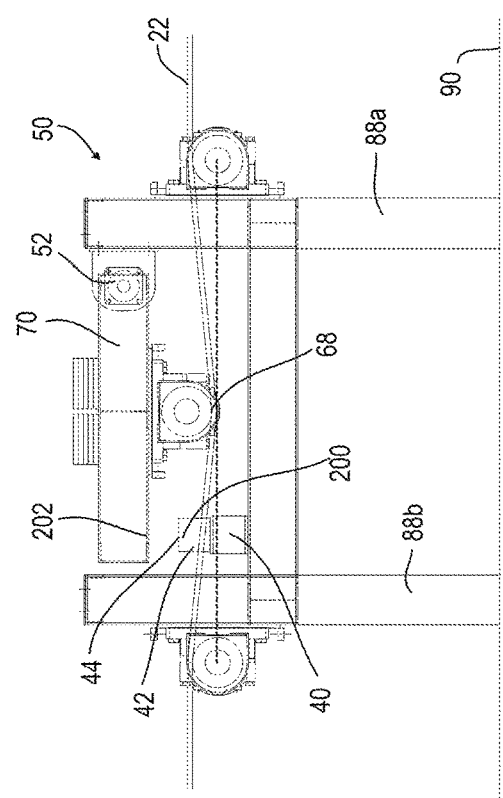
FIG. 10 is a side enlarged view of the device shown in FIG. 5 with the conveyor belt in a third tension and utilizing a second support system.

FIGS. 9 and 10 show two optional support systems for the belt tension measuring device 50.

In the example shown in FIG. 9, a plurality of tension supports 86 (*a-b*) may allow the belt tension measuring device 50 to be suspended from rigid supports (not shown) and prohibited from moving in direction of travel 36, nor vertically, nor laterally. The tension supports 86 may be ropes, cables, or other devices in tension.

FIG. 10 shows an alternative support system comprising a plurality of compression supports 88 (*a-b*). In this example, the compression supports 88 rest upon and may be mounted to the floor 90 or equivalent support structure.

The relative position of the axis 54 of the deflection roller 56 relative to the frame members 78 or other structures may be measured in various ways; three examples are disclosed herein.

The first example is shown in FIG. 5 and comprises the rotation indicator 55 at the pivot 52 or thereabout. The rotation indicator 55 shows the rotational inclination of the support arm 50 and attached deflection roller 56 relative to the frame 72 to which are attached to the first end roller 62 and second end roller 66. Thus, the angle 53, deflection 38, and resultant offset 68 may be measured indirectly through the rotation indicator 100. One example of such a rotation indicator 55 is a rotary encoder.

In another example, shown in FIG. 9, a linear position 150 may be measured between a point or marking 152 on the support arm 70 or other component attached to the deflection roller 56 and a measurement gauge 154 on the frame 72 or other structure which does not pivot with the deflection roller 56. Samples of such apparatuses capable of achieving such a linear measurement include a laser finder, rangefinder, proximity detector, graduated markings, etc.

A similar and functionally equivalent system to measure the offset 68 is shown in FIG. 10. This example comprising a proximity sensor 200. The proximity sensor 200 in this example sensing the distance between the distal end 202 (end away from the pivot 52) of the support arm 70 relative to the frame 72. In one example, the frame 72 is fixed to the axes 60 and 64 of the first end roller 62 and second end roller 66, the offset 68 can be measured indirectly through the proximity indicator 200.

In the example shown in FIG. 10, the proximity indicator 200 may be mounted to a rotational limiting apparatus 40 which as shown in the example of FIG. 5 substantially prohibits rotation of the support arm 70 about the pivot 52 beyond a desired angle 53. The rotational limiting apparatus 40 may include a bumper 42 comprised of a malleable material such as rubber, wood, etc. to prohibit damage to the belt tension measuring device 50, belt 22, or other structures or personnel resulting from a broken belt 22 or significant loss of tension in the belt 22.

The rotational limiting apparatus 40 may also comprise a limit switch 44 configured such that contact of the distal end 202 of the support arm 70 with the limit switch 44 will engage a tensioning system configured to increase the tension on the belt 22 by controlling the torque of a motor 51 as previously described, or alternatively increasing the tension on a tensioning device 32, increasing drag on a roller, etc.

Figure 11:
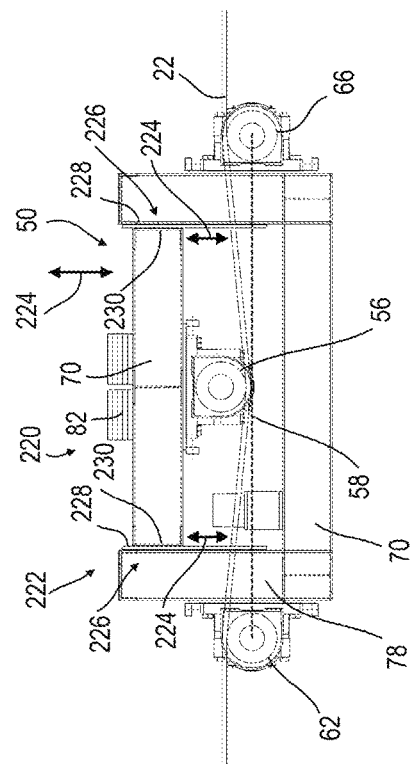
FIG. 11 is a side view of the device shown in FIG. 5 with an alternate structure facilitating movement of a deflection roller.

Looking to FIG. 11 is shown another example 220 of a belt tension measuring device 50 utilizing a linear mount system 222. The linear mount 226 provides the same function as the pivot 52 of the example shown in FIG. 5. In this example the deflection roller 56 moves linearly along lines 224 rather than rotationally as in a previous example.

Linear motion 224 may be achieved by one or more linear mounts or slides 226 having a first part 228 fixed to the frame 78 and a second part 230 fixed to allow linear movement of the deflection roller 56 relative to the frame 78. The first (fixed) part 228 may be a channel for example with the second part 230 fitted therein comprising sliding or rolling components that allow linear motion of the deflection roller 56, mass 82, and support arm 70 along the direction(s) 224 orthogonal to the line 58 but do not allow substantial transverse nor rotational movement of the deflection roller 56. In one example, the support arm 70 is attached to one or more of the second parts 230 of the linear mount system 222, extending there between and supporting the mass 82 while allowing linear movement of the attached deflection roller 56.

In the example shown, the deflection roller 56 is mounted to a support arm 70 having a linear mount 226 on each end. The support arm 70 connecting the deflection roller 56 to the frame 70 while the linear mount system 222 allows the deflection roller 56 to move linearly relative to the frame 78 and deflect the belt 22. As with the previous example, a mass (additional weight) 82 may be used to calibrate deflection of the belt 22. The mass 82 may be adjusted as part of calibration of either example, the rotational example of FIG. 5 or the linear example of FIG. 11 as well as other non-disclosed moving structures.

In the linear example of FIG. 11, the first (fixed) part 228 may comprise a grooved or t-shaped channel wherein the second (moving) part 230 may comprise rollers or slides fit into these grooves or channels. The system 222 thus allowing free linear movement of the deflection roller 56 with very little friction.

Although shown in the examples where the deflection roller 56 moves substantially orthogonal to the line 58, it may alternatively move angularly or arcuately relative to the frame 78 with similar efficiency and reliability.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A conveyor belt tension measuring device comprising:
   the conveyor belt being a continuous loop, configured to convey material as the conveyor belt moves along a series of rollers;
   a first end support supporting the conveyor belt at a first location;
   a second end support supporting the conveyor belt at a second location;
   a support arm mounted to reposition relative to the first end support;
   a deflection roller mounted to the support arm;
   the deflection roller resting upon the conveyor belt, pressed against the conveyor belt via gravity;
   the deflection roller configured to bias the conveyor belt against the first end support, as well as the second end support; and
   a position indicator measuring the position of the deflection roller relative to the first end support and second end support as a function of conveyor belt tension.

2. The conveyor belt tension device as recited in claim 1 wherein the first end support is a first roller having an axis of rotation.

3. The conveyor belt tension device as recited in claim 2 wherein the second end support is a second roller having an axis of rotation parallel to the axis of rotation of the first end roller.

4. The conveyor belt tension device as recited in claim 3 wherein the position indicator measures the distance between the axis of rotation of the deflection roller and a line drawn between the axis of rotation of the first end roller and the axis of rotation of the second end roller as a function of belt tension.

5. The conveyor belt tension device as recited in claim 1 wherein the deflection roller has a rotational axis parallel to the axis of rotation of the first end roller.

6. The conveyor belt tension device as recited in claim 1 wherein the position indicator measures the distance between the axis of rotation of the deflection roller and a line drawn between the first end support and the second end roller as a function of belt tension.

7. The conveyor belt tension device as recited in claim 1 wherein the second end support is a second roller having an axis of rotation parallel to the axis of rotation of the first end roller.

8. The conveyor belt tension device as recited in claim 1 wherein the support arm is pivotably mounted to pivot about an axis parallel to the axis of rotation of the first end roller.

9. The conveyor belt tension device as recited in claim 1 wherein the support arm is mounted to linearly reposition relative to the axis of rotation of the first end roller.

10. A conveyor belt tension measuring device comprising:
    the conveyor belt being a continuous loop, configured to convey material on as first surface thereof as the conveyor belt moves along a series of rollers;
    a frame fixed in space;
    a first end support attached to the frame, the first end supporting the conveyor belt at a first location;
    a second end support attached to the frame, the second end supporting the conveyor belt at a second location;
    a support arm having a first end rotationally mounted via a pivot to the fame to reposition relative to the first end support;
    a deflection roller mounted to a second end of the support arm so as to freely reposition about the pivot;
    the deflection roller resting upon the conveyor belt via gravity;
    the deflection roller configured to bias the conveyor belt against the first end support, as well as the second end support; and
    a position indicator measuring the rotational position of the support arm relative to the first end support and second end support as a function of conveyor belt tension.

* * * * *